United States Patent
Taylor

(10) Patent No.: US 11,411,318 B2
(45) Date of Patent: Aug. 9, 2022

(54) SATELLITE ANTENNA HAVING PANTOGRAPHIC TRUSSES AND ASSOCIATED METHODS

(71) Applicant: EAGLE TECHNOLOGY, LLC, Melbourne, FL (US)

(72) Inventor: Robert M. Taylor, Rockledge, FL (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 0 days.

(21) Appl. No.: 17/114,637

(22) Filed: Dec. 8, 2020

(65) Prior Publication Data

US 2022/0181787 A1     Jun. 9, 2022

(51) Int. Cl.
*H01Q 15/16* (2006.01)
*H01Q 3/40* (2006.01)
*H01Q 1/28* (2006.01)

(52) U.S. Cl.
CPC ........... *H01Q 15/161* (2013.01); *H01Q 1/288* (2013.01); *H01Q 3/40* (2013.01)

(58) Field of Classification Search
CPC ...... H01Q 1/125; H01Q 1/126; H01Q 1/1235; H01Q 1/288; H01Q 15/161; B64G 1/222; B64G 1/66
See application file for complete search history.

(56) References Cited

U.S. PATENT DOCUMENTS

| | | | | |
|---|---|---|---|---|
| 4,380,013 A | * | 4/1983 | Slysh | H01Q 1/288 343/753 |
| 5,243,803 A | | 9/1993 | Tabata et al. | |
| 5,857,648 A | * | 1/1999 | Dailey | B64G 1/222 244/172.6 |
| 6,353,421 B1 | * | 3/2002 | Lalezari | H01Q 1/288 343/881 |

(Continued)

FOREIGN PATENT DOCUMENTS

EP   2351148     11/2013
JP   H0659880    8/1994

(Continued)

OTHER PUBLICATIONS

Cherniavsky et al., "Large Deployable Space Antennas Based on Usage of Polygonal Pantograph," ASCE Journal of Aerospace Engineering, vol. 18, Issue 3, Jul. 2005, (Abstract only), p. 1.

(Continued)

*Primary Examiner* — Andrea Lindgren Baltzell
*Assistant Examiner* — Yonchan J Kim
(74) *Attorney, Agent, or Firm* — Allen, Dyer, Doppelt + Gilchrist, P.A.

(57) ABSTRACT

A satellite includes first and second extensible pantographic trusses, each configured to extend outwardly from the satellite in opposite directions from a stored position to a deployed position, and first and second sets of ribs carried by the respective first and second extensible pantographic trusses. A Radio Frequency (RF) reflective film may be (Continued)

carried by the first and second sets of ribs to define a curved RF reflector surface. The satellite antenna may include first and second sets of phased array antenna feeds carried by the respective first and second extensible pantographic trusses and directed toward the RF reflective film, which in an example may be a RF reflective mesh.

14 Claims, 6 Drawing Sheets

(56) References Cited

U.S. PATENT DOCUMENTS

| | | | |
|---|---|---|---|
| 9,550,584 B1 | 1/2017 | Harvey et al. | |
| 2008/0204342 A1* | 8/2008 | Kharadly | H01Q 3/20 343/781 R |
| 2017/0093046 A1 | 3/2017 | Harvey et al. | |
| 2019/0207291 A1 | 7/2019 | Harvey et al. | |

FOREIGN PATENT DOCUMENTS

| | | |
|---|---|---|
| JP | H07312521 | 11/1995 |
| JP | H08265040 | 10/1996 |
| RU | 2583420 | 5/2016 |

OTHER PUBLICATIONS

Yan et al., "Kinematic Analysis of the Deployable Truss Structures for Space Applications," J. Aerosp Technol. Manag., São José dos Campos, vol. 4, No. 4, Oct.-Dec. 2012, pp. 453-462.

Lane et al., "Overview of the Innovative Space-Based Radar Antenna Technology Program," Journal Of Spacecraft And Rockets, vol. 48, No. 1, Jan.-Feb. 2011, pp. 135-145.

Turner et al., U.S. Appl. No. 16/988,806, filed Aug. 10, 2020.

* cited by examiner

SATELLITE ANTENNA HAVING PANTOGRAPHIC TRUSSES AND ASSOCIATED METHODS

FIELD OF THE INVENTION

The present invention relates to the field of antennas, and more particularly, to a deployable antenna for a satellite and related methods.

BACKGROUND OF THE INVENTION

Large antennas for satellites may undergo physical distortions due to vibration, thermal effects, and other factors. For example, the distortion of a 20 meter antenna on its Radio Frequency (RF) reflector surface can range up to 5 millimeters or more at either end depending on the antenna design. If the magnitude of the distortion is a significant fraction of an operating wavelength, the antenna performance may degrade. In some cases, this degradation in antenna performance may significantly impact the operation of the antenna and satellite, especially with large antennas having dimensions of hundreds of wavelengths.

One approach to mitigate distortion effects in the antenna is to design the antenna to minimize the physical distortion sensitivity. For example, rigid and heavy arms that support an RF reflective film may be attached to each other and to the satellite body or an antenna support pedestal to reduce distortion of the RF reflective film. This rigid design, however, results in increased weight and costs for the antenna, and is still a challenge for larger satellite antennas, which still may have some physical distortion during satellite operation.

The Defense Advanced Research Projects Agency (DARPA) initiated an Innovative Space-Based Radar Antenna Technology (ISAT) program to investigate critical satellite technologies, including antenna metrology and physical distortion or deformation compensation of large, deployable space radar antennas, such as a 300 meter phased array antenna described in the article from Lane et al., "Overview of the Innovative Space-Based Radar Antenna Technology Program" (2010). In this study, a phased array reflector was modeled to include a deployable support truss that minimized distortion and a phased array electronically scanned array (ESA) cooperating with the phased array RF reflector surface positioned on the deployable support truss.

This ISAT antenna included a series of deployable bays, each containing a parabolic trough of antenna mesh and a phased array feed. Each bay was deployed by a set of radial arms around a hub and by a rigid truss pushed out with four jack screws, which folded down for compaction. This ISAT antenna design, however, was considered inefficient for a smaller trough reflector antenna of about 20 meters.

Another proposal for a smaller phased array-fed parabolic trough reflector antenna includes first and second lead screw-driven telescoping booms, each boom having respective sets of ribs that support the reflective film and form individual phased array antenna bays. The fully deployed antenna includes a cord network surrounding the telescoping boom, where the tension in each cord is balanced to maintain a low bending load in the boom. However, during antenna deployment from the satellite, one rib and its associated bay is deployed sequentially one rib at a time. As a result, the antenna has some of its bays fully deployed and under tension, while other bays remain slack, creating an imbalanced load on the telescoping boom with enough moment to cause it to bind. Some proposals have been implemented to relieve this moment on the telescoping boom with cord flexures to create different stiffnesses in the cord truss or by moving the cord truss locations. These proposals may create a more complex antenna system that is challenging to implement.

SUMMARY OF THE INVENTION

In general, an antenna for a satellite may include first and second extensible pantographic trusses, each configured to extend outwardly from the satellite in opposite directions from a stored position to a deployed position. A first set of ribs may be carried by the first extensible pantographic truss and a second set of ribs may be carried by the second extensible pantographic truss. The first and second sets of ribs may be configured to be in spaced apart relation when the first and second pantographic trusses are in the deployed position. A Radio Frequency (RF) reflective film may be carried by the first and second sets of ribs to define a curved RF reflector surface. A first set of phased array antenna feeds may be carried by the first extensible pantographic truss, and a second set of phased array antenna feeds may be carried by the second pantographic truss. The first and second sets of phased array antenna feeds may be directed toward the RF reflective film.

The first and second extensible pantographic trusses may be configured to extend linearly outwardly from the satellite in opposite directions. The first extensible pantographic truss may comprise a first set of truss members pivotally coupled at respective first crossing points, and the second extensible pantographic truss may comprise a second set of truss members pivotally coupled at respective second crossing points. The first set of ribs may be coupled to respective ones of the first plurality of crossing points, and the second set of ribs may be coupled to respective ones of the second plurality crossing points. The first extensible pantographic truss may comprise a first actuating cable associated with the first set of truss members, and the second extensible pantographic truss may comprise a second actuating cable associated with the second set of truss members. A first motor may be coupled to the first actuating cable, and a second motor may be coupled to the second actuating cable.

In yet another example, a first set of phased array signal cables may be carried by the first extensible pantographic truss and coupled to respective ones of the first set of phased array feeds, and a second set of phased array signal cables may be carried by the second extensible pantographic truss and coupled to respective ones of the second set of phased array feeds. A cord network may be coupled to the first and second sets of ribs. The RF reflective film may comprise an RF reflective mesh.

Another aspect is directed to a method for deploying an antenna for a satellite and may comprise extending first and second extensible pantographic trusses of the antenna outwardly from the satellite in opposite directions from a stored position to a deployed position. The antenna may comprise a first set of ribs carried by the first extensible pantographic truss and a second set of ribs carried by the second extensible pantographic truss. The first and second sets of ribs may be moved into spaced apart relation when the first and second pantographic trusses are moved into the deployed position. A Radio Frequency (RF) reflective film may be carried by the first and second sets of ribs to define a curved RF reflector surface. A first set of phased array antenna feeds may be carried by the first extensible pantographic truss and a second set of phased array antenna feeds carried by the second extensible pantographic truss, the first and second sets of phased array antenna feeds directed toward the RF reflective film.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION

The present description is made with reference to the accompanying drawings, in which exemplary embodiments are shown. However, many different embodiments may be used, and thus, the description should not be construed as limited to the particular embodiments set forth herein. Rather, these embodiments are provided so that this disclosure will be thorough and complete. Like numbers refer to like elements throughout, and prime notation is used to indicate similar elements in different embodiments.

Figure 1:
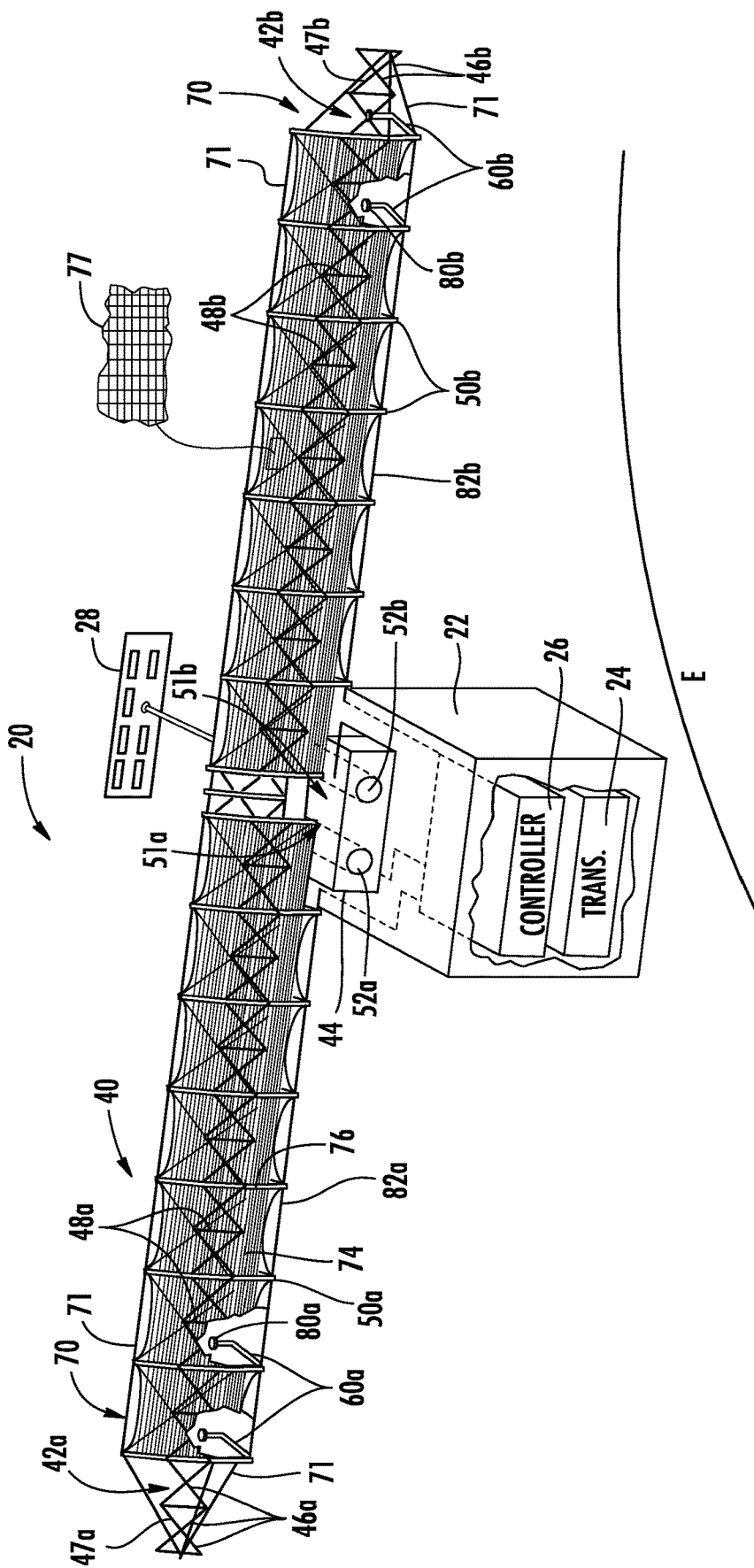
FIG. 1 is a perspective view of a first embodiment of the antenna mounted on a satellite and showing first and second extensible pantographic trusses and associated ribs in a deployed position in accordance with a non-limiting example.

Referring initially to FIG. 1, a satellite is illustrated generally at 20 and shown orbiting Earth (E) such as at a mid-earth orbit (MEO), although other satellite orbit altitudes may be established depending on satellite functions and design. The satellite 20 includes a satellite housing 22 shown in partial cut-away, and a satellite transceiver 24 and controller 26 carried by the satellite housing and shown through the cut-away section. Solar panels 28 provide power that is stored in a satellite battery (not shown) contained in the satellite housing 22 to power the satellite transceiver 24, controller 26 and other components. The satellite transceiver 24, controller 26 and any associated electronic components and circuits may be formed from conventional off-the-shelf (COTS) components or be custom manufactured for the satellite 20.

An antenna for the satellite 20 is indicated generally at 40 and formed as a phased array antenna and carried by the satellite housing 22 and coupled to the satellite transceiver 24 and controller 26. Although an antenna 40 for a satellite 20 is described, the antenna can be used for terrestrial and other applications. The antenna 40 may be a direct radiating phased array antenna with no reflector and the antenna may be a phased array fed reflector antenna as described in further detail below.

The antenna 40 includes first and second extensible pantographic trusses 42a, 42b, each configured to extend outwardly from the satellite 20 in opposite directions from a stored position to a deployed position. The first and second extensible pantographic trusses 42a, 42b in this example, are mounted on a support pedestal 44 that extends outward from the satellite housing 22 upon deployment of the antenna 40 when the satellite 20 reaches the desired altitude in operation. In an example, the first and second extensible pantographic trusses 42a, 42b are configured to extend linearly outward from the satellite 20 in opposite directions as shown in FIG. 1.

Figure 2:
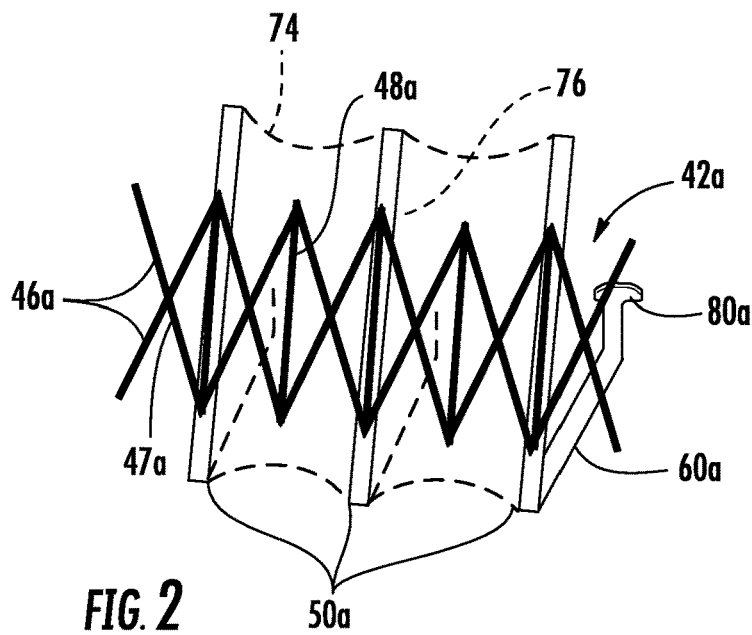
FIG. 2 is a partial, schematic view of a section of the pantographic truss of the antenna of FIG. 1 in a partly deployed position.
Figure 3:
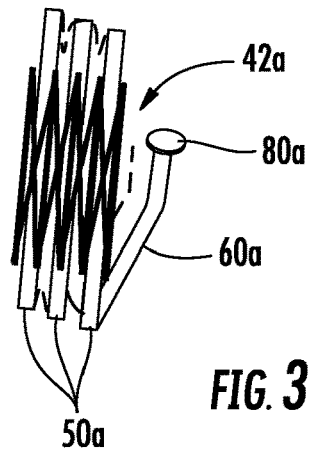
FIG. 3 is a partial, schematic view of the pantographic truss of FIG. 2 in a stored position.

The first extensible pantographic truss 42a includes a first set of truss members 46a pivotally coupled at respective first crossing points 47a and the second extensible pantographic truss 42b includes a second set of truss members 46b pivotally coupled at respective second crossing points 47b as better shown in greater detail in FIGS. 2 and 3, illustrating a portion of the first extensible pantographic truss in a respective partly deployed position (FIG. 2) and in a stored position (FIG. 3). A first set of ribs 50a are coupled to the first set of truss members 46a and a second set of ribs 50b are coupled to the second set of truss members 46b.

Figure 4:
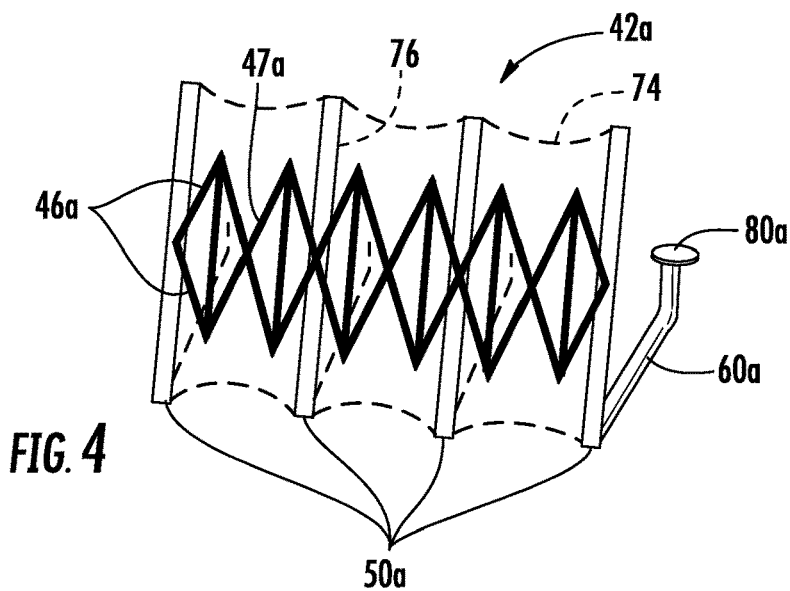
FIG. 4 is a partial, schematic view of the pantographic truss showing the ribs coupled at crossing points of truss members.

In an example, the first and second sets of ribs 50a, 50b are supported by first and second extensible pantographic trusses 42a, 42b at an end of each of first and second sets of truss members 46a, 46b as shown in FIGS. 1-3, and pivotally and slidably attached, such that each rib has two separated and supported points of attachment on the truss members. Alternatively, the first set of ribs 50a may be pivotally connected to the first plurality of crossing points 47a and the second set of ribs 50b may be pivotally connected to the second plurality of crossing points 47b as shown in the example of a portion of the first extensible pantographic truss 42a in FIG. 4, but this configuration has only one point of attachment for the ribs as compared to the two points of attachment in the example of FIGS. 1-3. Each of the first and second extensible pantographic trusses 42a, 42b may include a central tension cord 48a, 48b interconnected to the respective truss members 46a, 46b. A portion of the antenna 40 in FIG. 1 is cut-away to show the first and second sets of ribs 50a, 50b, and in FIGS. 2-4, a number of ribs are partially shown in dashed configuration.

As shown schematically in FIG. 1, the first extensible pantographic truss 42a includes a first actuating cable 51a associated with the first set of truss members 46a, and the second extensible pantographic truss 42b includes a second actuating cable 51b associated with the second set of truss members 46b. A first motor 52a is coupled to the first actuating cable 51a and a second motor 52b is coupled to the second actuating cable 51b. Referring to the left side of the antenna 20 of FIG. 1, the first actuating cable 51a is routed through the first extensible pantographic truss 42a and crosses each bay as the central tension cord 48a. Therefore, when the first motor 52a applies tension to the first actuating cable 51a, that tension applies deployment force to every bay in the first extensible pantographic truss 42a. The central tension cord 48a is one segment of the first actuating cable 51a in an example. The same functions occur with similar components on the right side of the antenna 20.

In the example of the satellite 20 and antenna 40 shown in FIG. 1, each motor 52a, 52b is a drive motor mounted in the support pedestal 44 to deploy the antenna 40 and move the first and second pantographic trusses 42a, 42b respectively linearly outward during antenna deployment. Each motor 42a, 42b is connected to the controller 26, which controls deployment of the antenna 40 after the satellite reaches the desired orbit by deploying outward the support pedestal 44 and then deploying the first and second extensible pantographic trusses 42a, 42b via the motors 52a, 52b and actuating cables 51a, 51b.

As illustrated in FIG. 1, the first and second sets of ribs 50a, 50b are configured to be in spaced apart relation when the first and second extensible pantographic trusses 42a, 42b are in the deployed position. Each individual rib 50a, 50b extends outward from the satellite housing 22 in synchronized motion with each other upon deployment of the antenna 40, and not sequentially one after the other as in the example of a telescoping boom that supports ribs. The first and second pantographic trusses 42a, 42b are formed to allow simultaneous deployment of the ribs 50a, 50b. A cord network 70 is coupled to the first and second pantographic trusses 42a, 42b and the first and second sets of ribs 50a, 50b to form a truss of individual cords 71 as longerons and diagonal cord elements where the bending loads may be carried in differential tension in the cord network and the loads resist bending.

Loads may be carried in differential tension within the cord network 70 between the individual cords 71 as longerons that extend longitudinally along the antenna 40, and loads may be carried in shear and in torsion by individual cords 71 as diagonals that help support the antenna. Because the structure of the first and second pantographic trusses 42a, 42b provide for simultaneous deployment of first and second sets of ribs 50a, 50b during deployment, there is no sequential rib deployment such as with a telescoping boom, and no imbalanced load where moment forces are applied on a telescoping boom to cause cords and antenna to bind. This synchronized deployment of ribs 50a, 50b is shown in the example of FIGS. 2 and 3, where the pantographic truss 50a is in the stored position (FIG. 3), and upon deployment of the antenna 40, the pantographic truss extends outward to move each rib 50a in a synchronized manner to each other as shown in FIG. 2, where the pantographic truss is in a partly deployed position. In the example of the antenna 40 of FIG. 1, it is possible that the two centermost ribs 50a, 50b may be fixed and do not move.

A radio frequency (RF) reflective film 74 is carried by the first and second sets of ribs 50a, 50b to define a curved or parabolic RF reflector surface indicated generally at 76, similar to a trough shape for the antenna 40. In this example, the RF reflective film 74 is formed as a reflective mesh 77, which may be formed as a knit structure, shown in FIG. 1 by the enlarged section broken away from the RF reflective film. The RF reflective film 74 forming the parabolic RF reflector surface 76 is connected to each of the first and second sets of ribs 50a, 50b. Each portion of the RF reflective film 74 positioned between the ribs 50a, 50b forms an antenna panel or a bulkhead as some skilled in the art may refer to that section. The curved RF reflector surface 76 is defined by the curved or parabolic shape of each rib 50a, 50b as shown by the curved backbone section of each rib in FIG. 1.

Each of the first and second sets of ribs 50a, 50b includes a support arm 60a, 60b connected to a lower end of each rib and extending outwardly therefrom and including a horizontal section followed by an upward extending section. A portion of the RF reflective film 74 is cut-away in the antenna 40 of FIG. 1 at the ends to show the support arms 60a, 60b, which are connected to a lower end of each rib 50a, 50b and extending outwardly therefrom to support respective first and second sets of phased array antenna feeds 80a, 80b that are directed toward the RF reflective film 74.

A first set of phased array signal cables 82a are carried by the first extensible pantographic truss 42a and coupled to respective ones of the first set of phased array antenna feeds 80a, and a second set of phased array signal cables 82b are carried by the second extensible pantographic truss 42b and coupled to respective ones of the second set of phased array antenna feeds 80b. When the antenna 40 is stored, the first and second sets of phased array signal cables 82a, 82b are bunched together. Upon deployment, the first and second sets of phased array signal cables 82a, 82b extend outwardly with the first and second extensible pantographic trusses 42a, 42b. The first and second sets of phased array antenna feeds 80a, 80b connect via the first and second sets of phased array signal cables 82a, 82b to the controller 26, which controls electronic scanning of the first and second sets of phased array feeds for phased array operation of the antenna 40.

The cord network 70 is slack when the antenna 40 is stored within the satellite housing 22, but upon deployment of the antenna into its deployed position, the cord network 70 tightens and provides support to the antenna and its first and second extensible pantographic trusses 42a, 42b. The cords 71 that form the cord network 70 may connect to cord support rods (not shown) and spread tension across the antenna 40 and its different panels or bulkheads formed from the RF reflective film 74 and engage the first and second sets of ribs 50a, 50b. Diagonal cords 71 stiffen the antenna 20 in torsion, and the longeron cords stiffen the antenna and balance the RF reflective film 74 tension across its depth. The cord network 70 helps provide tension to maintain the parabolic or trough shape of the RF reflective film 74. The total mesh tension of the RF reflective film 74 may be about 11 to 12 pounds in an example, and the different tensions of individual cords 71 against the corners and ends of first and second sets of ribs 50a, 50b may be about 4 to 5 pounds, and impart about 6 pounds tension when cord support rods are employed.

In a non-limiting example, the antenna aperture formed by the RF reflective film 74 in this example is about 20 meters long and about 1.3 meters in height. The antenna 40 dimensions and configuration may vary depending on design and operating conditions chosen by those skilled in the art.

It is possible that fiducial devices (not shown) may be carried by the first and second sets of ribs 50a, 50b and imaged by a camera to sense physical distortion of the antenna 40 and the RF reflective film 74. An example of fiducials that may be used is described in U.S. patent application Ser. No. 16/988,806, filed Aug. 10, 2020, and entitled, "Satellite Antenna Having Fiducial Devices for Compensating Physical Distortion and Associated Methods," the disclosure which is hereby incorporated by reference in its entirety. An example configuration of a rib and cord network is also disclosed in the incorporated by reference '806 application and may be used for the antenna 40 as described. The controller 26 may cooperate with any camera, such as disclosed in the incorporated by reference '806 application, and operate the first and second sets of phased array feeds 80a, 80b to account for sensed physical distortion of the RF reflective film by controlling phased array scanning to compensate for any distortion in the RF reflective film 74.

Figure 5:
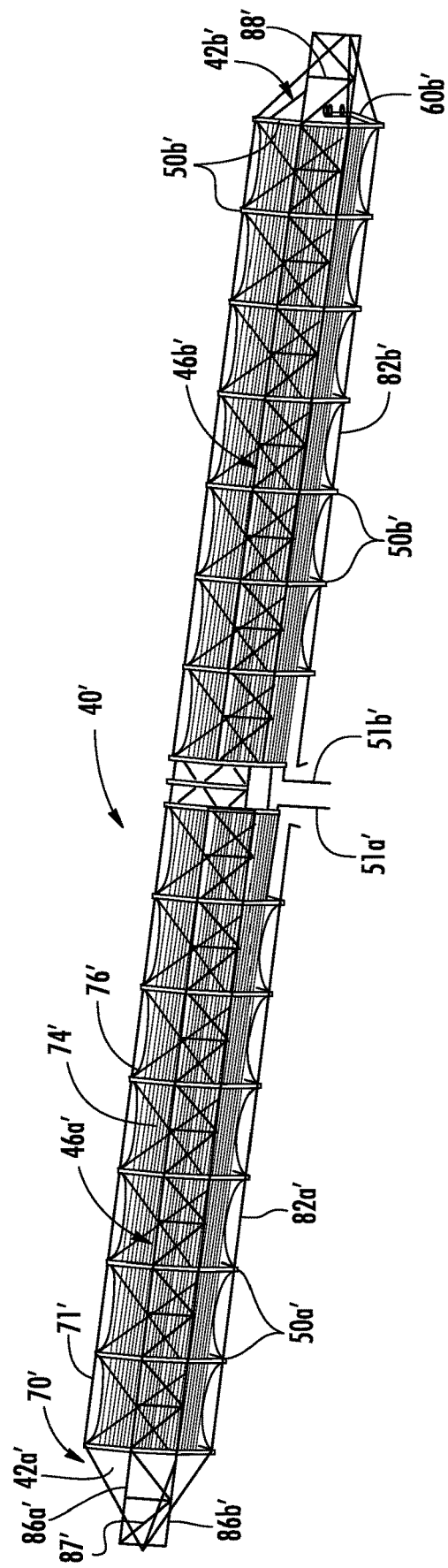
FIG. 5 is a perspective view of a second embodiment of the antenna that includes extensible pantographic trusses having longerons.
Figure 6:
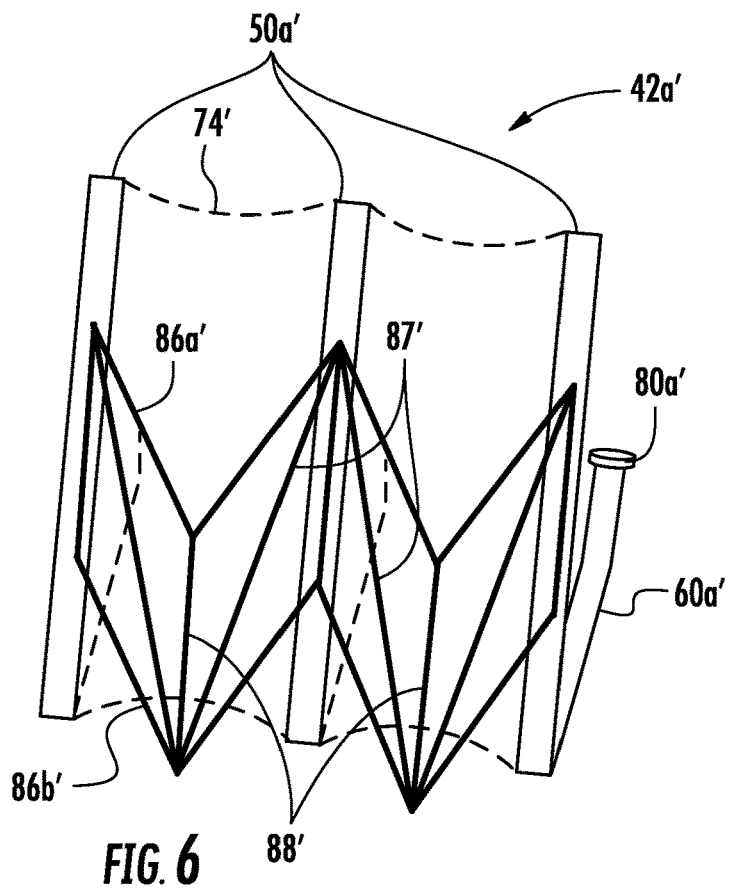
FIG. 6 is a partial, schematic view of a section of the pantographic truss of the antenna of FIG. 5 in a partly deployed position.
Figure 7:
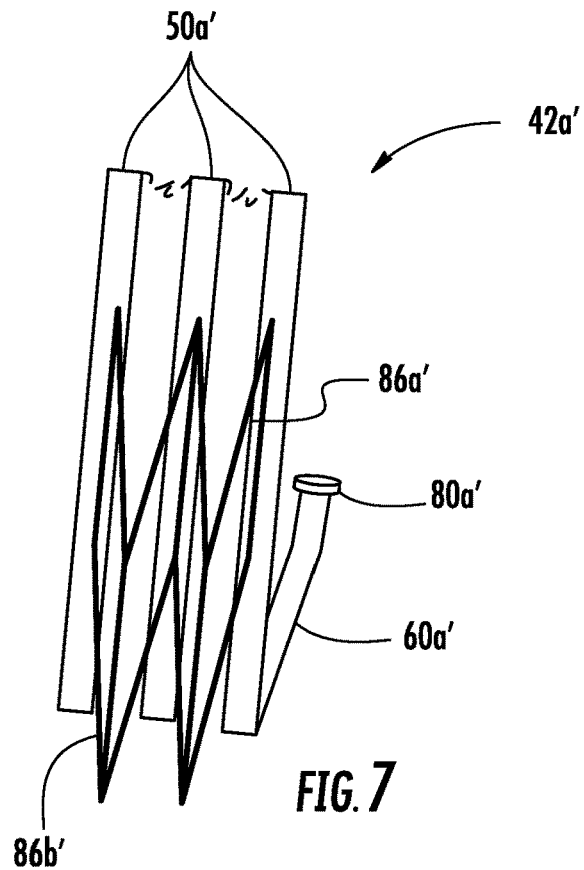
FIG. 7 is a partial, schematic view of the pantographic truss of FIG. 6 in a stored position.

Referring now to FIGS. 5-7, there is illustrated a second embodiment of the antenna 40' (FIG. 5) where each extensible pantographic or deployable truss 42a', 42b' is formed different from the pantographic truss 42a, 42b described with reference to FIGS. 1-4 and considered as a deployable truss. It should be understood that the term "pantographic" as used herein encompasses not only the embodiment shown in FIGS. 1-4 based upon a parallelogram structure, but also the embodiments shown in FIGS. 5-7 to cover a jointed framework that deploys and includes upper and lower longeron members, diagonal extensions, and other members that may form a triangular or rectangular structure. The antenna 40' includes first and second sets of truss members 46a', 46b' formed as upper and lower longeron members 86a', 86b', diagonal extension members 87', and a center batten 88' as shown more clearly in the partially deployed position for a section of the first extensible pantographic truss 42a' (FIG. 6). In the stored position (FIG. 7), the longeron members 86a', 86b', diagonal extension members 87', and center batten 88' are in a folded position. Upon deployment (FIG. 5), a three-dimensional rectangular truss structure is formed for the first and second pantographic trusses 42a', 42b'. A similar actuating mechanism may be used with first and second actuating cables 51a', 51b' and motors (not shown). Drawing in an actuating cable 51a', 51b' may shorten the diagonal extension member 87', in each of the first and second extensible pantographic trusses 42a', 42b' to deploy the antenna 40'. The deployment of the rectangular truss is not coupled by a parallelogram pantograph to be synchronous, therefore, some bays can deploy initially before others. However, increasing forces as the longerons are tensioned will cause all bays to react and build tension in the extensible diagonals at roughly the same rate because the deployment cable passes through each bay. Therefore, while the deployment will not be perfectly synchronous, the tensioning of the truss cords will be balanced and will not create large moments in the structure. First and second sets of phased array signal cables 82a', 82b' may be used as in the embodiment of the antenna 40 of FIG. 1. As further illustrated in FIGS. 5-7, the second embodiment of the antenna 40' includes first and second sets of ribs 50a, 50b', and respective support arms 60a', 60b', cord network 70', the truss of individual cords 71', the reflective film 74', trough-shaped as a curved RF reflector surface 76', first set of phased array antenna feeds 80a', and the first and second sets of phased array signal cables 82a', 82b'.

Figure 8:
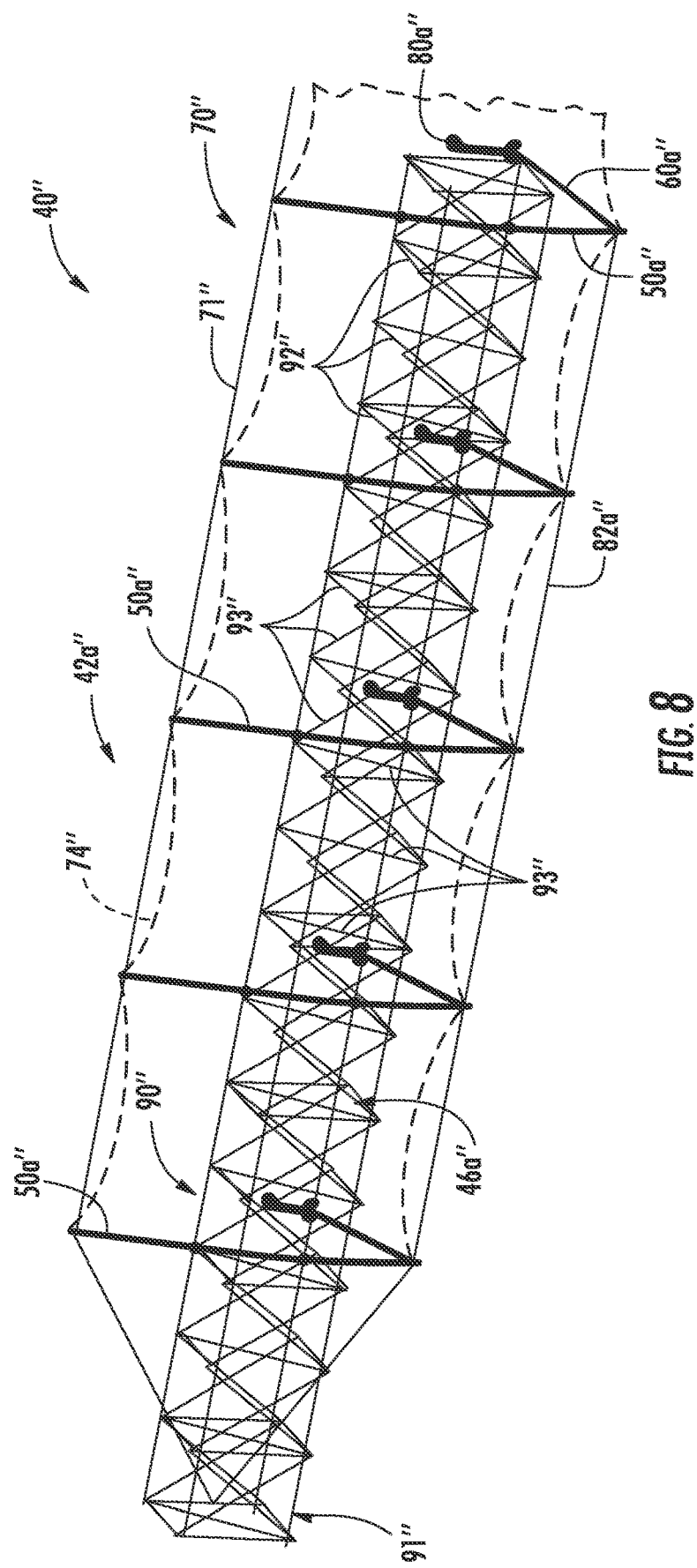
FIG. 8 is a perspective view of a portion of a third embodiment of the antenna using three-dimensional extensible pantographic trusses.

In a third embodiment of the antenna 40", the first and second extensible pantographic trusses 42a" may have three-dimensional depth and form a rectangular cross-section as shown in FIG. 8, showing an example of a section of the first pantographic truss 42a", which includes a front pantograph section 90" that connects to the first set of ribs 50a", and a rear pantographic section 91". This pantographic truss 42a" includes truss members 46a" formed as internal battens 92" and internal diagonals 93" as illustrated. In this example of the antenna 40" of FIG. 8, the ribs 50a", 50b" are positioned on every third bay of the pantographic truss 42a". In other embodiments, the three dimensional truss could have a triangular configuration, could use the rectangular truss shown in FIGS. 6-7, or could use some other deployable three-dimensional truss. As further illustrated in FIG. 8, the antenna 40" includes support arms 60a", cord network 70", the truss of individual cords 71", reflective film 74", first set of phased array antenna feeds 80a", first set of phased array signal cables 82a", front pantographic section 90", and internal diagonals 93".

In operation, which explanation is described with reference to FIG. 1, but also applies to the antenna embodiments 40', 40" of FIGS. 5 and 8, the antenna 40 is extended outwardly from the satellite housing 22 when the satellite 20 reaches the desired altitude above the Earth. The first and second extensible pantographic trusses 42a, 42b extend outwardly from the satellite in opposite directions from the stowed position to a deployed position. The first and second sets of ribs 50a, 50b can move together outward or can be deployed individually. When the antenna 20 is fully deployed, the individual cords 71 in the cord network 70 coupled to the first and second sets of ribs 50a, 50b carry the differential tension, shear and torsion to help support the antenna. The antenna 40 may have feeds hinged to the ribs 50a, 50b similar to a row of folding doors, and fold into a stack in the middle of the aperture and then unfold to lay flat and parallel to the reflector.

Figure 9:
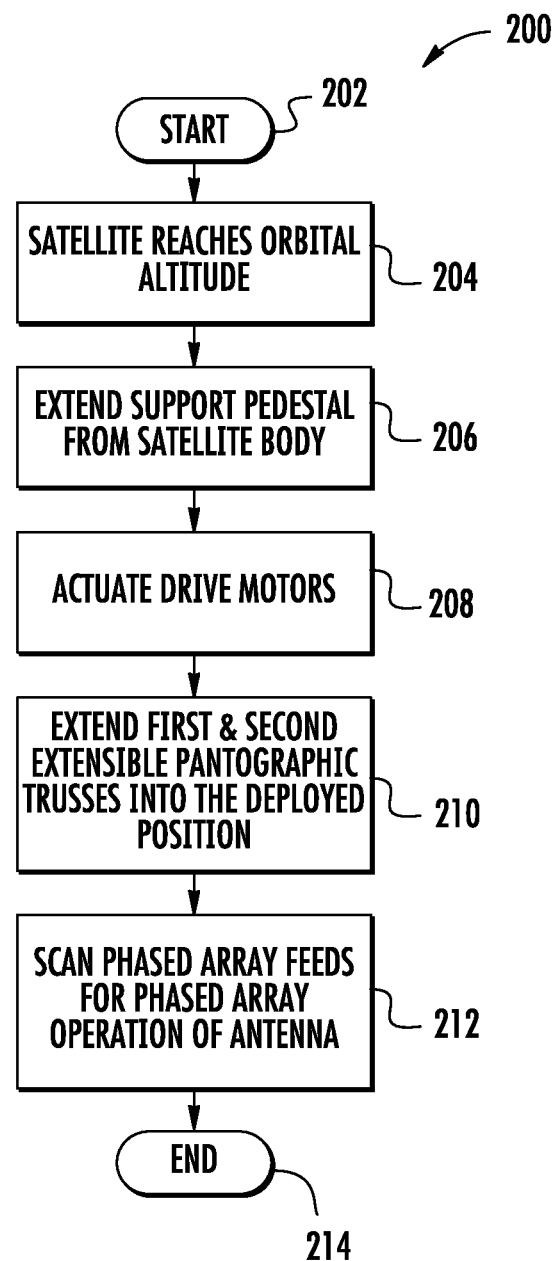
FIG. 9 is a high-level flowchart of a method for deploying the antennae of FIGS. 1, 5, and 8.

Referring now to FIG. 9, a high-level flowchart of a method used for deploying the antennas of FIGS. 1, 7 and 8 is illustrated and shown generally at 200 and described with reference to the antenna 40 of FIG. 1. The process starts (Block 202), and when the satellite 20 reaches a predetermined orbital altitude (Block 204), the support pedestal 46 for the antenna is extended outward from the satellite housing 22 (Block 206).

The drive motors 52a, 52b are actuated (Block 208) and the first and second extensible pantographic trusses 42a, 42b of the antenna 40 are extended outwardly from the satellite 20 in opposite directions linearly from the stored position to a deployed position (Block 210). The antenna 40 includes the basic components as described above and the controller 26 is operated to cooperate and scan the first and second sets of phased array antenna feeds 80a, 80b for phased array operation of the antenna (Block 212). The process ends (Block 214).

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An antenna for a satellite comprising: first and second extensible pantographic trusses, each configured to extend outwardly from the satellite in opposite directions from a stored position to a deployed position, wherein the first extensible pantographic truss comprises a first set of truss members pivotally coupled at respective first crossing points, a first central tension cord interconnected to the first set of truss members, a first actuating cable associated with the first set of truss members and the first central tension cord, and a first motor coupled to the first actuating cable, and wherein the second extensible pantographic truss comprises a second set of truss members pivotally coupled at respective second crossing points, a second central tension cord interconnected to the second set of truss members, a second actuating cable associated with the second set of truss members and the second central tension cord, and a second motor coupled to the second actuating cable; a first set of ribs carried by the first extensible pantographic truss and a second set of ribs carried by the second extensible pantographic truss, the first and second sets of ribs configured to be in spaced apart relation when the first and second extensible pantographic trusses are in the deployed position, wherein upon actuation of the first and second motors and deployment of the first and second pantographic trusses, each of the first and second sets of ribs extend outward in synchronized and simultaneous motion with each other; a Radio Frequency (RF) reflective film carried by the first and second sets of ribs to define a trough-shaped RF reflector surface; and a first set of phased array antenna feeds carried by the first extensible pantographic truss and a second set of phased array antenna feeds carried by the second extensible pantographic truss, the first and second sets of phased array antenna feeds directed toward the RF reflective film.

2. The antenna of claim 1 wherein the first and second extensible pantographic trusses are configured to extend linearly outwardly from the satellite in opposite directions.

3. The antenna of claim 1 wherein the first set of ribs are coupled to respective ones of the first crossing points; and wherein the second set of ribs are coupled to respective ones of the second crossing points.

4. The antenna of claim 1 comprising a first set of phased array signal cables carried by the first extensible pantographic truss and coupled to respective ones of the first set of phased array antenna feeds; and a second set of phased array signal cables carried by the second extensible pantographic truss and coupled to respective ones of the second set of phased array antenna feeds.

5. The antenna of claim 1 comprising a cord network coupled to the first and second sets of ribs.

6. The antenna of claim 1 wherein the RF reflective film comprise an RF reflective mesh.

7. The antenna of claim 1 wherein between a pair of ribs, a phased array feed is hinged to fold in half and stow 90° to its deployed position.

8. An antenna for a satellite comprising: first and second extensible pantographic trusses, each configured to extend linearly outwardly from the satellite in opposite directions from a stored position to a deployed position, wherein the first extensible pantographic truss comprises a first set of truss members pivotally coupled at respective first crossing points, a first central tension cord interconnected to the first set of truss members, a first actuating cable associated with the first set of truss members and the first central tension cord, and a first motor coupled to the first actuating cable, and wherein the second extensible pantographic truss comprises a second set of truss members pivotally coupled at respective second crossing points, a second central tension cord interconnected to the second set of truss members, a second actuating cable associated with the second set of truss members and the second central tension cord, and a second motor coupled to the second actuating cable; a first set of ribs carried by the first extensible pantographic truss and a second set of ribs carried by the second extensible pantographic truss, the first and second sets of ribs configured to be in spaced apart relation when the first and second extensible pantographic trusses are in the deployed position, wherein upon actuation of the first and second motors and deployment of the first and second pantographic trusses, each of the first and second sets of ribs extend outward in synchronized and simultaneous motion with each other; and a Radio Frequency (RF) reflective mesh carried by the first and second sets of ribs to define a trough-shaped RF reflector surface.

9. The antenna of claim 8 wherein the first set of ribs are coupled to respective ones of the first crossing points; and wherein the second set of ribs are coupled to respective ones of the second crossing points.

10. The antenna of claim 8 comprising a cord network coupled to the first and second sets of ribs.

11. A method for deploying an antenna for a satellite comprising: extending first and second extensible pantographic trusses of the antenna outwardly from the satellite in opposite directions from a stored position to a deployed position; the antenna comprising a first set of ribs carried by the first extensible pantographic truss and a second set of ribs carried by the second extensible pantographic truss, the first and second sets of ribs moved into spaced apart relation when the first and second pantographic trusses are moved into the deployed position, wherein the first extensible pantographic truss comprises a first set of truss members pivotally coupled at respective first crossing points, a first central tension cord interconnected to the first set of truss members, a first actuating cable associated with the first set of truss members and the first central tension cord, and a first motor coupled to the first actuating cable, and wherein the second extensible pantographic truss comprises a second set of truss members pivotally coupled at respective second crossing points, a second central tension cord interconnected to the second set of truss members, a second actuating cable associated with the second set of truss members and the second central tension cord, and a second motor coupled to the second actuating cable, wherein upon actuation of the first and second motors and deployment of the first and second pantographic trusses, each of the first and second sets of ribs extend outward in synchronized and simultaneous motion with each other; and a Radio Frequency (RF) reflective mesh carried by the first and second sets of ribs to define a trough-shaped RF reflector surface, and a first set of phased array antenna feeds carried by the first extensible pantographic truss and a second set of phased array antenna feeds carried by the second extensible pantographic truss, the first and second sets of phased array antenna feeds directed toward the RF reflective film.

12. The method of claim 11 wherein the extending comprises extending the first and second extensible pantographic trusses linearly outwardly from the satellite in opposite directions.

13. The method of claim 11 wherein the first set of ribs are coupled to respective ones of the first crossing points; and wherein the second set of ribs are coupled to respective ones of the second crossing points.

14. The method of claim 11 wherein the RF reflective film comprise an RF reflective mesh.

* * * * *